United States Patent Office 3,305,214
Patented Feb. 21, 1967

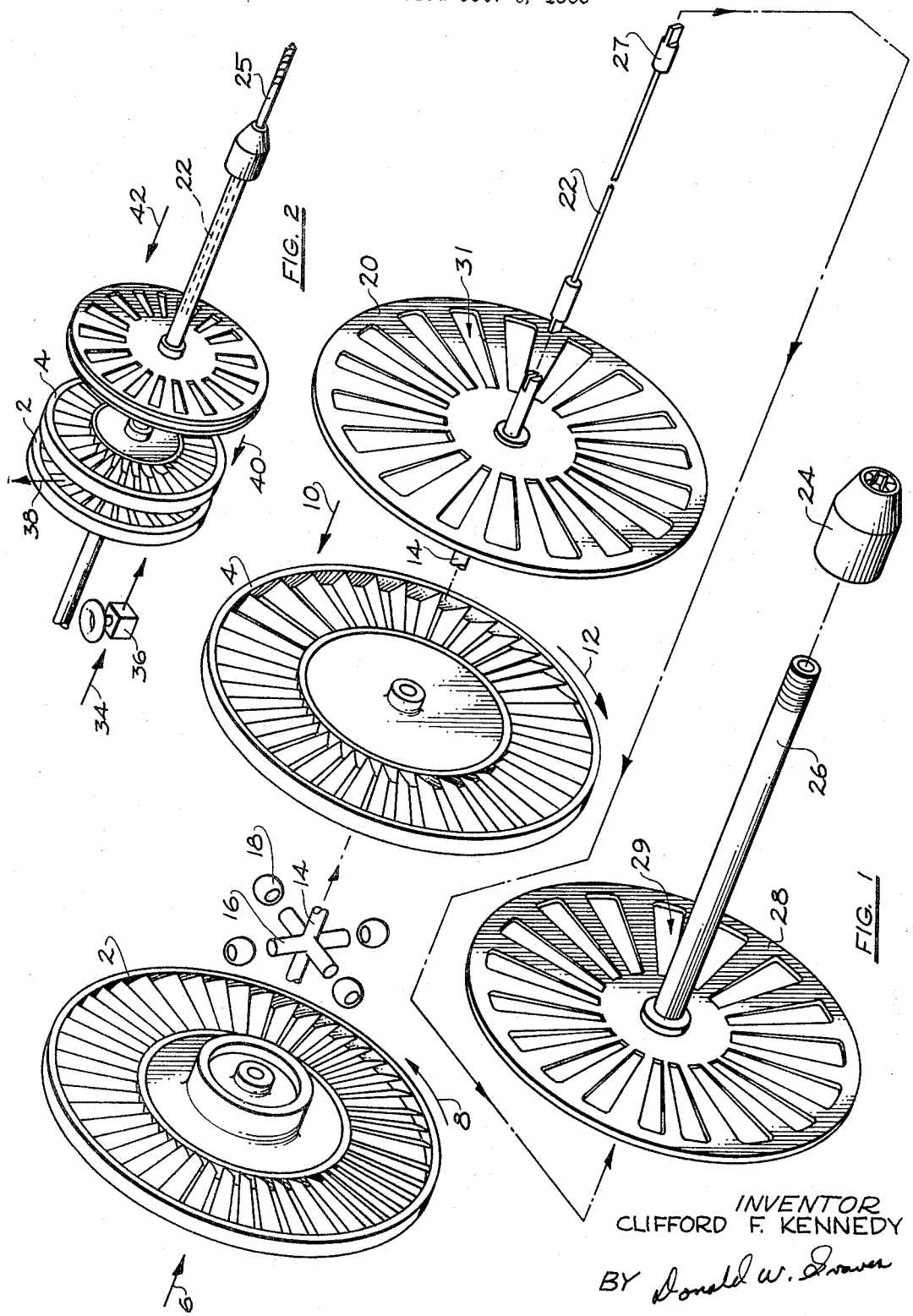

3,305,214
DIFFERENTIAL TURBINE
Clifford F. Kennedy, Simi, Calif., assignor to
North American Aviation, Inc.
Filed Oct. 5, 1965, Ser. No. 493,202
3 Claims. (Cl. 253—16.5)

This invention relates to a differential turbine.

More particularly, this invention relates to a differential turbine in which at least two turbine wheels revolve in opposite directions against a common set of rollers mounted on a drive shaft.

In U.S. patent application Serial No. 279,800 filed on May 10, 1963, and assigned to the assignee of this invention, there is shown and described a torque controlled mechanism in which a machine tool such as a drill cuts into a work piece. The torque or load on the drill is sensed by a sensing mechanism to vary the motor speed and feed rate to maintain constant torque.

In U.S. Patent No. 3,038,307 there is shown and described a rotating differential turbine wheel assembly and gear system so as to combine the output of two turbines.

This invention is directed to a differential turbine system for rotating a drive shaft and utilizes at least two turbine wheels rotatably mounted on a drive shaft. The drive shaft has a plurality of pins extending normally therefrom, each of which has a roller rotatably mounted thereon. The turbine wheels are in rolling contact with the rollers such that when the wheels rotate in opposite directions at the same speed, no torque will be imparted to the drive shaft. When the relative speed of one turbine wheel is varied relative to the other, torque will be imparted to the drive shaft to cause rotation thereof. As an added feature of this invention, means are provided to sense the torque imparted to the drive shaft so as to change the speed of rotation thereof to maintain constant torque.

An object of this invention is to provide an improved differential turbine assembly.

Another object of this invention is to provide an improved differential turbine which has a torque sensing and control device associated therewith.

Other objects and advantages of this invention will become apparent as this description proceeds taken in conjunction with the drawings in which;

FIG. 1 is an exploded view of the differential turbine system of this invention and the torque sensing device, and FIG. 2 is a schematic of the differential turbine system and torque sensing device as assembled and used on a drilling mechanism and further illustrates the fluid flow.

Referring to FIG. 1, the turbine system includes a first turbine wheel 2 and a second turbine wheel 4. Air passing in the direction of arrow 6 will cause rotation of turbine wheel 2 in the direction of arrow 8 and air flow in the direction of arrow 10 will cause turbine wheel 4 to rotate in the direction of arrow 12. Turbine wheels 2 and 4 are rotatably mounted by bearings not shown on drive shaft 14. Drive shaft 14 has a plurality of protrusions or pins 16 which, for example, for purposes of illustration, are shown as four in number. Each of the pins has rotatably mounted thereon rollers 18. Turbine wheels 2 and 4 are each mounted on drive shaft 14 so as to be in parallel juxtaposed position and in rolling contact with rollers 18 situated therebetween. Air flow in the direction of arrows 6 and 10 serve to force wheels 2 and 4 together against rollers 18 to obviate slippage between the rollers and the wheels.

Fixedly mounted to drive shaft 14 is a first shutter valve wheel 20. Fixedly attached to the drive shaft 14 is a torque bar 22 which is attached to drill chuck 24. Assembled over torque bar 22 is a cylindrical member or tube 26 which has fixedly attached thereto a second shutter valve wheel 28 which freely surrounds torque bar 22 except at end 27. Tube 26 is likewise attached to chuck 24.

Although a tube is shown as surrounding the torque bar, it is within the scope of this invention to provide other means to connect shutter valve wheel 28 to chuck 24. For example, this could comprise a cage and for that matter the shutter valve wheel can be directly connected to chuck 24 with torque bar 22 shortened. It is, however, important that shutter valve wheel 20 and 28 be in close juxtaposed position to each other so that air or other fluid will not be diffused between them.

While pins 16 are shown as supporting rollers 18, it is within the scope of this invention to provide other means whereby rollers 18 are in rolling contact with turbine wheels 2 and 4 while being able to impart torque to drive shaft 14. Rollers 18 can be round or of the tapered roller type. The rollers can be replaced by gears engaging teeth on each wheel with the gears mounted in a manner similar to the rollers.

The assembled turbine assembly is shown in FIG. 2. Fluid such as air entering in the direction of arrow 34 which is controlled by valve means 36 passes through turbine wheel 2 and is exhausted in the direction of arrow 38 between wheels 2 and 4. In a similar manner air in the direction of arrow 40 will pass through turbine wheel 4 and likewise be exhausted in the direction of arrow 38. When the air supply in the direction of arrows 34 and 40 are equal, turbine wheels 2 and 4 will rotate at opposite directions at an equal speed which results in no torque being imparted to chuck 24 through torque bar 22.

By manipulation of valve 36, the air supply to turbine 2 can be increased or decreased at will, thus changing the relative speed of rotation as between turbine wheels 2 and 4 resulting in rotation of drive shaft 14. When the device is to be used with the torque sensing mechanism in such applications as drilling, chuck 24 is fitted with drill bit 25. By proper proportioning of the torque bar 22 dimensions, a predetermined amount of torque will result in a predetermined circumferential shifting of shutter valve wheel 20 relative to shutter valve wheel 28 in response to a load or torque applied to bit 25. At zero torque, no air is admitted through the shutter valve wheels in the direction of arrow 42 since apertures 29 in wheel 28 are not aligned with apertures 31 in wheel 20. When torque is imparted to drill bit 25, torque bar 22 will twist resulting in increasing alignment of the apertures in shutter valve 28 and 20. The areas of the aligned portions of the openings are dependent on the amount of twisting in response to torque applied to chuck 24. Air will then be admitted in the direction of arrow 42 and when added to air in the direction of arrow 40 will result in speeding up of turbine wheel 4 relative to turbine wheel 2. By proper proportional air flow, the torque transmitted to chuck 24 and drill bit 25 will be decreased due to slowing down of drive shaft 14 which allows the shutter valve holes to again be misaligned progressively shutting off the air flow in the direction of arrow 42.

Several advantages of this device result. For example, by rotating each of the turbine wheels 2 and 4 in the neighborhood of 100,000 r.p.m., a 1 percent slowing down of one wheel and a 1 percent speeding up of the other wheel results in an increase of r.p.m. of the drive shaft from zero to 2,000 r.p.m. Thus, it takes only a very small percentage change in turbine wheel velocity to result in a very large change in actual r.p.m. of the drive shaft. A problem has existed in turbine driven machinery in the past in providing instantaneous acceleration due to a lag in acceleration of the turbine drive elements. In the instant case since the turbine wheels are already rotating at a high velocity, a small change in fluid flow to the wheels results in a high acceleration of the drive shaft. To further increase response time, turbine wheels 2 and 4 are constructed so as to have a low moment of inertia.

It may be noted further that the device constructed according to this invention is not dependent on a heavy gear train. For example, in the aforementioned patent to Oprecht, a system of planetary, ring and sun gears is necessary, the total of which results in a structure having a high inertia factor. In the instant device, gearing is unnecessary in that the drive shaft can be coupled directly to the load rather than depending on the shifting of speeds of rotation of one gear relative to other gears.

Thus it can be seen that by employing the principles of this invention that a drive system having high acceleration characteristics as well as simplicity has been achieved. In addition, a relatively simple torque means can be utilized where desired which does not interfere with the operation of the turbine drive.

While this invention has been described as having particular application to a torque controlled drilling machine, this is given as an example only. The invention is considered to have direct applicability wherever a drive shaft is utilized. Thus, this turbine differential system could be used in automobiles, pumps and other devices that provide a rotary power take-off.

It is noted that while the fluid flow has been described as passing through turbine wheels 2 and 4, it is within the scope of this invention to provide other means to slow down or speed up each turbine wheel. Thus, tangential flow directed against blades on the wheel periphery can be used, including oppositely directed flows for each of the turbine wheels.

Having described my invention, it is to be understood that it is to be limited only by the scope of the claims appended hereto.

I claim:

1. A differential turbine device comprising;
   a drive shaft,
   a first wheel having turbine blades thereon mounted on said drive shaft,
   a second wheel having turbine blades thereon mounted on said drive shaft,
   shaft driving means mounted between and in driving engagement with said first and second wheels,
   means for selectively causing fluid to be impinged against said turbine blades of said first and second wheels, whereby when said wheels are rotated in opposite directions at the same rate, said drive shaft remains stationary and when said wheels are rotated at different rates, said drive shaft is caused to rotate,
   a third wheel having openings therein to allow passage of additional fluid to the turbine blades of said second wheel, said third wheel being mounted on said drive shaft,
   a torque bar attached at one end to said third wheel,
   a fourth wheel juxtaposed to said third wheel and having openings therein,
   means to attach said fourth wheel to the other end of said torque bar,
   whereby when torque is transmitted to said torque bar, the alignment of the openings in said third and fourth wheels is varied so as to control the flow of additional fluid.

2. A differential turbine device comprising;
   a drive shaft having a plurality of protruding pins normal to said drive shaft,
   rollers mounted on said pins and adapted to rotate relative thereto,
   a first wheel having turbine blades thereon mounted on said drive shaft and in rolling contact with said rollers,
   a second wheel having turbine blades thereon mounted on said drive shaft and in rolling contact with said rollers,
   means for selectively causing fluid to be impinged against said turbine blades of said first and second wheels, whereby when said wheels are rotated in opposite directions at the same rate, said drive shaft remains stationary and when said wheels are rotated at different rates, said drive shaft is caused to rotate,
   a third wheel having openings therein to allow passage of additional fluid to the turbine blades of said second wheel, said third wheel being mounted on said drive shaft,
   a torque bar attached at one end to said third wheel,
   a fourth wheel having openings therein and mounted on a tube, said tube being attached to the other end of said torque bar,
   whereby when torque is transmitted to said torque bar, the alignment of the openings in said third and fourth wheels is varied so as to control the flow of additional fluid.

3. The structure according to claim 2 further comprising a drill chuck attached to said torque bar.

References Cited by the Examiner

UNITED STATES PATENTS

| 1,461,422 | 7/1923 | Jolly et al. | 253—16.5 |
| 1,777,428 | 10/1930 | Charliss | 253—16.5 |

FOREIGN PATENTS

| 260,398 | 8/1949 | Switzerland. |

EDGAR W. GEOGHEGAN, *Primary Examiner.*

EVERETTE A. POWELL, JR., *Examiner.*